United States Patent [19]

Schopper

[11] Patent Number: 4,659,151
[45] Date of Patent: Apr. 21, 1987

[54] BRAKING PRESSURE CONTROL UNIT FOR A DUAL-CIRCUIT VEHICLE BRAKE SYSTEM ACTUATABLE BY PRESSURE FLUID

[75] Inventor: Bernd Schopper, Hattersheim, Fed. Rep. of Germany

[73] Assignee: Alfred Teves GmbH, Frankfurt, Fed. Rep. of Germany

[21] Appl. No.: 749,182

[22] Filed: Jun. 26, 1985

[30] Foreign Application Priority Data

Jun. 29, 1984 [DE] Fed. Rep. of Germany ....... 3424004

[51] Int. Cl.$^4$ .......................... B60T 8/26; B60T 11/00; B60T 17/18
[52] U.S. Cl. .................................. 303/6 C; 188/349; 303/22 R; 303/84 R
[58] Field of Search ............... 303/6 C, 6 R, 22 R, 303/22 A, 84 A, 84 R; 188/195, 349; 137/102, 543, 23

[56] References Cited

U.S. PATENT DOCUMENTS

| 3,806,207 | 4/1974 | Reinecke et al. | 303/22 R |
| 4,119,352 | 10/1978 | Masuda | 303/6 C |
| 4,418,965 | 12/1983 | Reinecke | 303/22 R |

FOREIGN PATENT DOCUMENTS 3017256 11/1981 Fed. Rep. of Germany .

*Primary Examiner*—Douglas C. Butler
*Attorney, Agent, or Firm*—James B. Raden; William J. Michals

[57] ABSTRACT

A braking pressure control unit comprises a valve assembly with a valve seat (25) formed fast with the housing and a closure member (26) which latter, with the brake circuits (I, II) intact, when performing its relative movement to the valve seat (25), is kept in abutment on an extension (II) of a stepped piston (6) by a closure spring (28) supported on a malfunction piston (7). The valve (25, 26) is prevented from closing by the extension (11) at the stepped piston (6) and by a stop (29) for the closure member (26) at the malfunction piston (7). Because of the closure member (26) being in constant abutment on the extension (11) of the stepped piston (6) during its relative movement, there results a smaller stroke of the malfunction piston (7) and thus less fluid input of the braking pressure control unit and less wear of the sealing elements (22, 23) at the malfunction piston (7).

5 Claims, 1 Drawing Figure

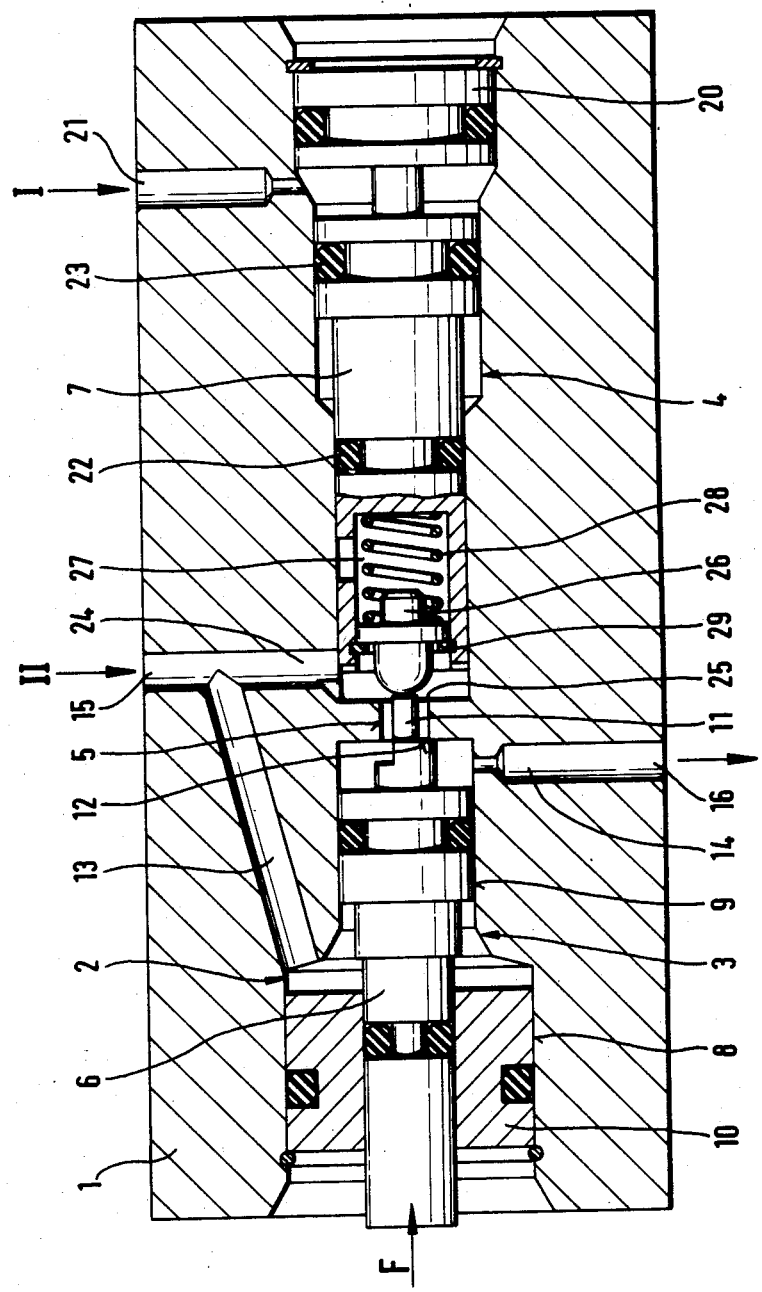

BRAKING PRESSURE CONTROL UNIT FOR A DUAL-CIRCUIT VEHICLE BRAKE SYSTEM ACTUATABLE BY PRESSURE FLUID

BACKGROUND OF THE INVENTION

This invention relates to a braking pressure control unit for a dual-circuit vehicle brake system actuatable by pressure fluid, wherein the relative movement between a closure member furnished with a closure spring and a valve seat of a valve assembly arranged in a housing between inlet and outlet of a first brake circuit is controlled by a stepped piston that is loaded by a control force. The valve seat is fixed with the housing. The stepped piston is located on the side of the valve seat remote from the closure member, and the closure member is actuatable by virtue of an extension of the stepped piston penetrating the valve seat. The relative movement is controllable by a malfunction piston which is slidable in a housing bore in a sealed relationship thereto and whose first effective surface is acted upon by the pressure in the first brake circuit and whose second effective surface is acted upon by the pressure in the second brake circuit. The closure spring is arranged between closure member and malfunction piston and the closure member is movable to bear against a stop of the malfunction piston.

A braking pressure control unit of this type is known from German printed patent application No. 30 17 256. Accommodated in the housing of this braking pressure control unit is the valve seat, with which a closure member cooperates. This closure member is loaded by a closure spring which is supported on the malfunction piston. The closure member is movable by the force of the closure spring to bear against a stop on a peg-shaped extension of the malfunction piston and embraces it with resilient arms. The valve can be prevented from closing by the tappet at the stepped piston penetrating the valve seat and by the malfunction piston coupled to the closure member. The malfunction piston is on both of its end surfaces acted upon by the pressure of a brake circuit and displaces towards the valve seat in the event of pressure build-up. A prop ring is movable into abutment on a stop at the closure member, on which prop ring one end of a restoring spring is supported which, with its other end, is supported on the malfunction piston and which is anchored between these components. The prop ring abuts on a housing area adjacent to the valve seat. When the brake system is unpressurized, the closure member is spaced from the tappet at the stepped piston. Upon relative movement of the closure member towards the valve seat, the closure member is lifted from the stop on the prop ring and is moved to bear against the valve seat or against the tapped of the stepped piston. In the event of pressure decrease, the closure member is moved by the restoring spring to abut on the prop ring. This braking pressure control unit entails substantial design efforts because of the provision of two anchored spring arrangements with their associated stop devices.

It is an object of the present invention to arrange a braking pressure control unit of the type described with a minimum number of components, while its principal mode of function is preserved.

SUMMARY OF THE INVENTION

This object is achieved according to the present invention in that the closure member, when performing its relative movement towards the valve seat, is disposed in abutment on the extension of the stepped piston, with the brake circuits being intact. Hence, during both the closing movement and the opening movement, the malfunction piston is displaced in a favorable manner essentially by the closure travel of the closure member. In the event of pressure decrease, the malfunction piston is displaced to assume its pressureless inactive position by the amount of the closure travel of the closure member, the displacement being effected by the movement the stepped piston performs by way of the closure member and the closure spring. Due to the small stroke of the malfunction piston, the volume input will be decreased, and the wear of the sealing assembly at the malfunction piston will also be reduced.

According to a preferred embodiment of the present invention, the closure member remains in abutment on the stop of the malfunction piston during the opening movement. As the force generated by the closure spring is greater than the friction force of the sealing assemblies arranged at the closure member, a malfunction piston will displace by the same amount. In a preferred embodiment of this invention, the displacement travel of the malfunction piston is substantially equal to the closure travel of the closure member.

A simplification of manufacture will result because the effective surfaces at the malfunction piston are of the same size, and that there is provided a spring which takes support on the side of the malfunction piston remote from the closure member and on the housing. In this case, the force generated by the closure spring is greater than the sum of the friction force of the sealing assemblies arranged at the malfunction piston and the force of the spring.

Furthermore, the closure member and the closure spring are accommodated in a hollow bore of the malfunction piston. A limitation of the displacing movement of the malfunction piston in the direction of the valve seat is simply provided by the end surface of the malfunction piston abutting on the housing area encompassing the valve seat.

BRIEF DESCRIPTION OF THE DRAWING

The present invention will be described in more detail in conjunction with the accompanying drawing wherein the single FIGURE is a sectional view of the braking pressure control unit in accordance with the present invention.

DETAILED DESCRIPTION

The housing 1 of the braking pressure control unit contains a stepped through-bore 2 which is composed of a cylindrical recess 3 starting from the left end face in the drawing, of a cylindrical recess 4 starting from the right end face thereof as well as of a connecting bore 5 linking the two recesses 3, 4. The recess 3 which is on the left in the drawing accommodates a stepped piston 6, while a malfunction piston 7 is arranged in the other recess 4.

Said recess 3 comprises a first area 8 of large diameter and a second area 9 of smaller diameter, succeeding to which latter is the connecting bore 8. Inserted into the large-diameter area 8 is a closure plug 10, through which a smaller-diameter portion of the stepped piston 6 projects sealedly from the housing 1 and, on the outside thereof, is acted upon a control force F.

At the transition from the large-diameter area 8 into the smaller-diameter area 9, a pressure fluid channel 13 is terminating which is in communication with an inlet port 15 of a brake circuit II. Terminating into the smaller-diameter area 9 close to the connecting bore 5 is a pressure fluid channel 14 which is connected with the outlet port 16 of the brake circuit II.

The stepped piston 6 is with a portion of large diameter sealedly slidable in the smaller area 9 of the recess 3. Said stepped piston 6 includes an extension 11 protruding through the connecting bore 5 into the recess 4. The diameter of the extension 11 is chosen such as to constitute an annular pressure fluid channel between extension 11 and the wall of the connecting bore 5. Said extension 11 comprises a step 12 which forms a stop device in conjunction with the edge of the connecting bore 5.

The recess 4 is stepped several times. Arranged in the largest portion extending from the end face is a closure plug 20 which closes the through-bore 2 in a pressure-fluid tight manner. A pressure fluid port 21 of the brake circuit 1 terminates into this area. The stepped malfunction piston 7 is slidable, sealed by seals 22, 23, in the mid-diameter area and in the area of smallest diameter of the recess 4. A pressure fluid channel 24 communicating with the inlet port 15 of the brake circuit II terminates in the smallest-diameter area of the recess 4 close to the connecting bore 5. At the end of the connecting bore 5 terminating into the recess 4, the valve seat 25 of a valve assembly is provided which cooperates with the closure member 26 arranged at the malfunction piston 7.

The closure member 26 is placed in a hollow bore 27 in the smaller-diameter portion of the malfunction piston 7. Said hollow bore 27 contains furthermore a closure spring 28 which is supported on the closure member 26 and on the bottom of the hollow bore 27 and which causes the closure member 26 to move into abutment on a stop 29 in the form of a circuit close to the open end of the hollow bore 27.

The inlet port 15 of the brake circuit II is connected to a pressure fluid source, for instance to the one chamber of a tandem master cylinder, while the outlet port 16 leads to the wheel brake cylinders of the rear-wheel brake. The pressure fluid port 21 is in communication with another pressure fluid source for a front-wheel brake circuit, for instance with the second chamber of a tandem master cylinder.

The following mode of operation results in the braking pressure control unit illustrated:

With the brake system unpressurized, the components have assumed their position illustrated in the drawing. When pressure develops in both brake circuits I, II, the pressure generated propagates by way of the inlet port 15 of the brake circuit II, the pressure fluid channel 24, the connecting bore 5, the pressure chamber in front of the inner end face of the stepped piston 6, the pressure fluid channel 14 and the outlet port 16 to the wheel-brake cylinders of the rear wheels.

Moreover, the pressure in the brake circuit II is applied by way of the connecting channel 13 on the annular effective surface at the stepped piston 6, which surface is defined by the sealed diameters of the stepped piston 6.

Furthermore, the pressure in the brake circuit II is exerted on the end face of smaller diameter of the malfunction piston 7, while the end face of larger diameter is acted upon by the pressure in the brake circuit I; due to this pressurization, the malfunction piston 7 displaces to the left until it abuts with its end face furnished with recesses on the housing 1. In consequence of the arrangement of the closure spring 28, the closure member 26 remains in abutment on the extension 11 of the stepped piston 6. Herein, the displacement travel of the malfunction piston 7 is chosen such as to be but little more than the closure travel of the closure member 26.

When the pressure in the brake circuit II reaches a predetermined value, the stepped piston 6 will displace in opposition to the control force F to the left, in respect to the illustration in the drawing, and the closure member 26 will close the valve passage for the first time. With the pressure continuing to rise, the valve opens and closes repeatedly, and the outlet pressure increasing is reduced in relation to the inlet pressure in the ratio of the pressurizable effective surfaces at the stepped piston 6.

In the event of pressure decrease, the stepped piston 6 returns to its inactive position illustrated under the influence of the control force F. The malfunction piston is moved back to its inactive position illustrated by way of the closure member 26 which is in abutment on the extension 11 of the stepped piston 6 and by way of the closure spring 28. Said closure spring 28 is rated such that its spring force is more than the sum of the friction forces which are caused upon displacement of the malfunction piston 7 due to the arrangement of the seals 22, 23 at the malfunction piston 7. During the opening action, said malfunction piston 7 will cover a distance which substantially corresponds to the closure travel of the closure member 26.

Upon failure of the brake circuit I, the malfunction piston 7 has assumed the position illustrated; it abuts on the closure plug 20 through a frontal peg. If there is a distance between malfunction piston 7 and closure plug 20 in the inactive position and with the brake circuits being intact, the malfunction piston 7 will be displaced, in the event of failure of the brake circuit I, due to being pressurized by the pressure in the brake circuit II until it abuts on the closure plug 20.

What is claimed is:

1. A braking pressure control unit for a dual-circuit vehicle brake system actuatable by pressure fluid, wherein the relative movement between a closure member furnished with a closure spring and a valve seat of a valve assembly arranged in a housing between inlet and outlet of a first brake circuit in communication with a first pressure source is controlled by a stepped piston that is resiliently urged into said housing by applying an external control force, and wherein the valve seat is fixedly formed with the housing, the stepped piston being located on the side of the valve seat remote from the closure member, and the closure member being actuatable by an extension integrally formed with the stepped piston with said extension penetrating the valve seat, and wherein said relative movement is controllable by a malfunction piston which is slidable in a housing bore in a sealed relationship thereto and whose first effective surface is acted upon by the pressure in the first brake circuit and whose second effective surface is acted upon by the pressure in the second brake circuit which is in communication with a second pressure source of said dual-circuit vehicle brake system, wherein the closure spring is arranged between closure member and malfunction piston and the closure member is movable to bear against a stop of the malfunction piston, wherein with the brake system being intact the closure member (26) is resiliently urged by said closure spring into constant abutment against the extension (11) of the stepped piston (6) when performing its relative movement towards the valve seat (25) and wherein upon a pressure failure in said second brake circuit said malfunction piston is translated within its range of said relative movement away from the valve seat (25) by the pressure prevailing in said first brake circuit.

2. A braking pressure control unit as claimed in claim 1, wherein the closure member (26) remains in abutment on the stop (29) of the malfunction piston (7) during the opening movement.

3. A braking pressure control unit as claimed in claim 2, wherein the displacement travel of the malfunction piston (7) is substantially equal to the closure travel of the closure member (26).

4. A braking pressure control unit as claimed in claim 3, wherein the effective surfaces at the malfunction piston are of the same size, and wherein said closure spring is mounted on the housing on the side of the malfunction piston remote from the closure member.

5. A braking pressure control unit as claimed in claim 4, wherein the closure member (26) and the closure spring (28) are accommodated in a hollow bore (27) of the malfunction piston (7).

* * * * *